United States Patent
Ido

(10) Patent No.: US 8,077,781 B2
(45) Date of Patent: Dec. 13, 2011

(54) APPARATUS AND METHOD FOR RECEIVING AN ORTHOGONAL FREQUENCY DIVISION MULTIPLEXED SIGNAL

(75) Inventor: Jun Ido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1121 days.

(21) Appl. No.: 11/792,345

(22) PCT Filed: May 11, 2006

(86) PCT No.: PCT/JP2006/009451
§ 371 (c)(1),
(2), (4) Date: Jun. 5, 2007

(87) PCT Pub. No.: WO2007/055042
PCT Pub. Date: May 18, 2007

(65) Prior Publication Data
US 2008/0123757 A1    May 29, 2008

(30) Foreign Application Priority Data

Nov. 8, 2005    (JP) .................................. 2005-323474

(51) Int. Cl.
*H04K 1/10* (2006.01)
(52) U.S. Cl. .......................... 375/260; 370/210; 370/208
(58) Field of Classification Search .................. 375/316, 375/260, 340, 346; 370/210, 344, 480, 208, 370/491
See application file for complete search history.

(56) References Cited

U.S. PATENT DOCUMENTS

| | | | |
|---|---|---|---|
| 2004/0008618 A1* | 1/2004 | Shirakata et al. | 370/208 |
| 2005/0105647 A1* | 5/2005 | Wilhelmsson et al. | 375/316 |
| 2005/0174929 A1 | 8/2005 | Hayashi et al. | |
| 2005/0213679 A1 | 9/2005 | Yamagata | |
| 2005/0213680 A1 | 9/2005 | Atungsiri et al. | |
| 2006/0023800 A1* | 2/2006 | Okada | 375/260 |
| 2006/0239178 A1* | 10/2006 | Svensson et al. | 370/208 |
| 2007/0036231 A1* | 2/2007 | Ido | 375/260 |
| 2007/0177685 A1* | 8/2007 | Kawauchi | 375/260 |
| 2007/0274406 A1* | 11/2007 | Adachi | 375/260 |
| 2008/0075186 A1* | 3/2008 | Kawauchi et al. | 375/260 |
| 2008/0219144 A1* | 9/2008 | Brehler et al. | 370/203 |

FOREIGN PATENT DOCUMENTS

| | | |
|---|---|---|
| EP | 1 006 699 A2 | 6/2000 |
| EP | 1 533 961 A2 | 5/2005 |
| JP | 2000-165346 A | 6/2000 |
| JP | 2000-286817 A | 10/2000 |
| JP | 2001-292122 A | 10/2001 |
| JP | 2002-094484 A | 3/2002 |
| JP | 2005-45664 A | 2/2005 |
| JP | 2005-151447 A | 6/2005 |
| JP | 2005-287043 A | 10/2005 |
| JP | 2005-312027 A | 11/2005 |
| WO | WO-2003/098853 A1 | 11/2003 |

* cited by examiner

*Primary Examiner* — Chieh M Fan
*Assistant Examiner* — Aristocratis Fotakis
(74) *Attorney, Agent, or Firm* — Birch, Stewart, Kolasch & Birch, LLP

(57) ABSTRACT

The value of a pilot signal extracted from the received signal is divided by the known value ($s_{m,n}$) of the pilot signal to obtain a channel characteristic value (3), changes in the timing of the Fourier transform are detected (5), and on the basis of the detected result, interpolated data are generated (4) by selection or interpolation in the time direction, using the channel characteristic values as the original data. The decoding error rate after equalization when the timing of the Fourier transform changes is lowered, and receiving performance is improved.

4 Claims, 6 Drawing Sheets

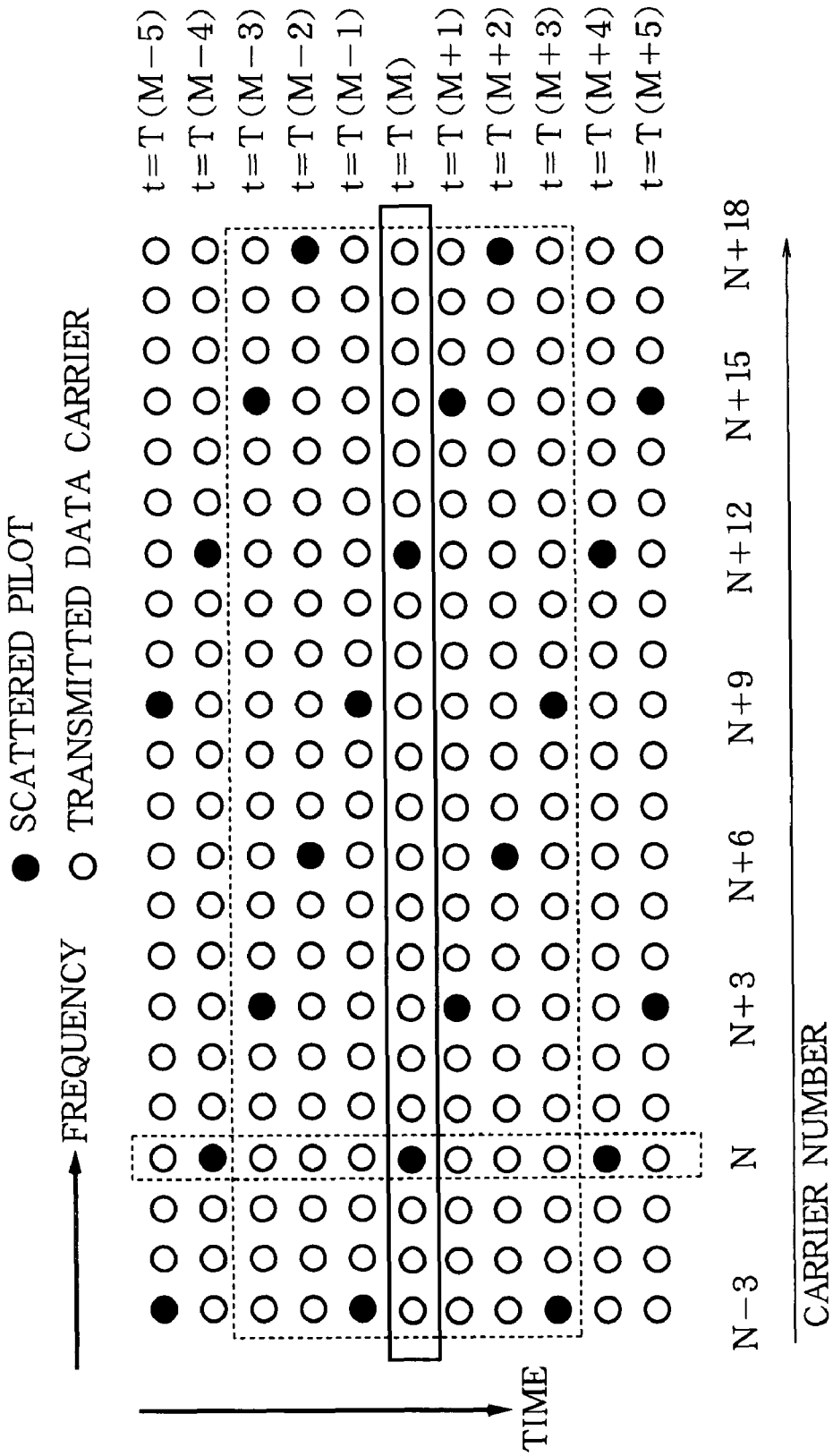

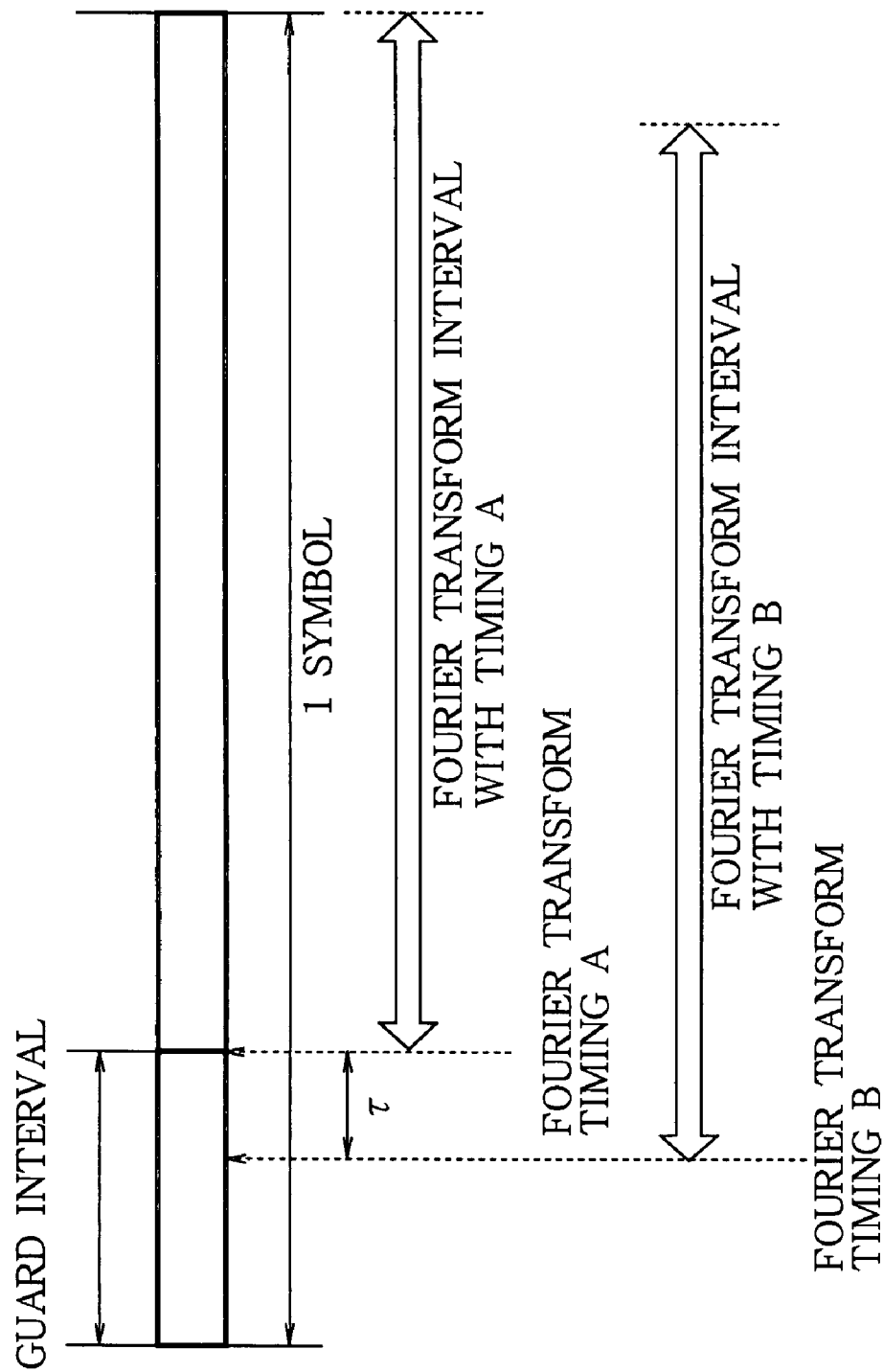

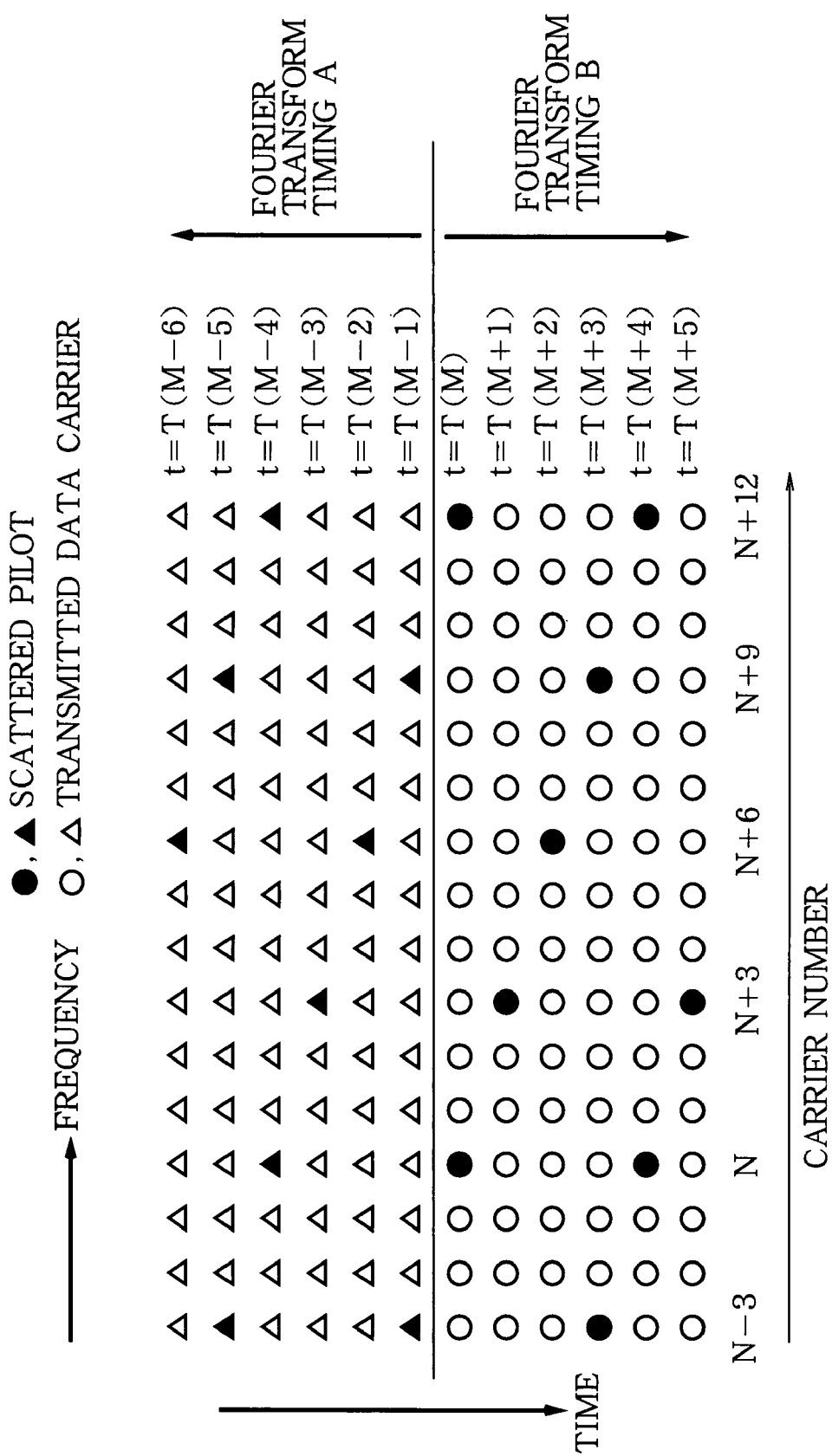

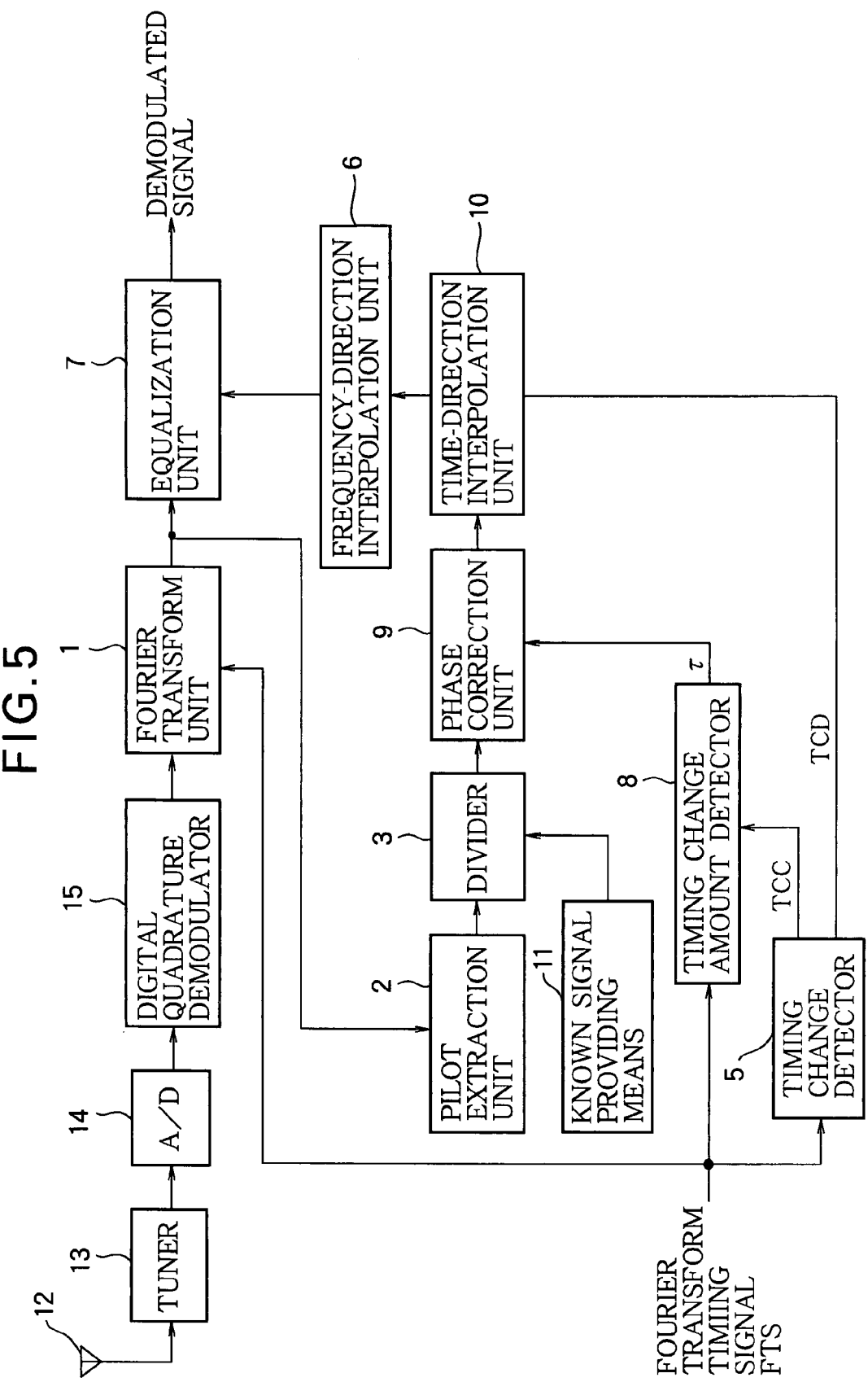

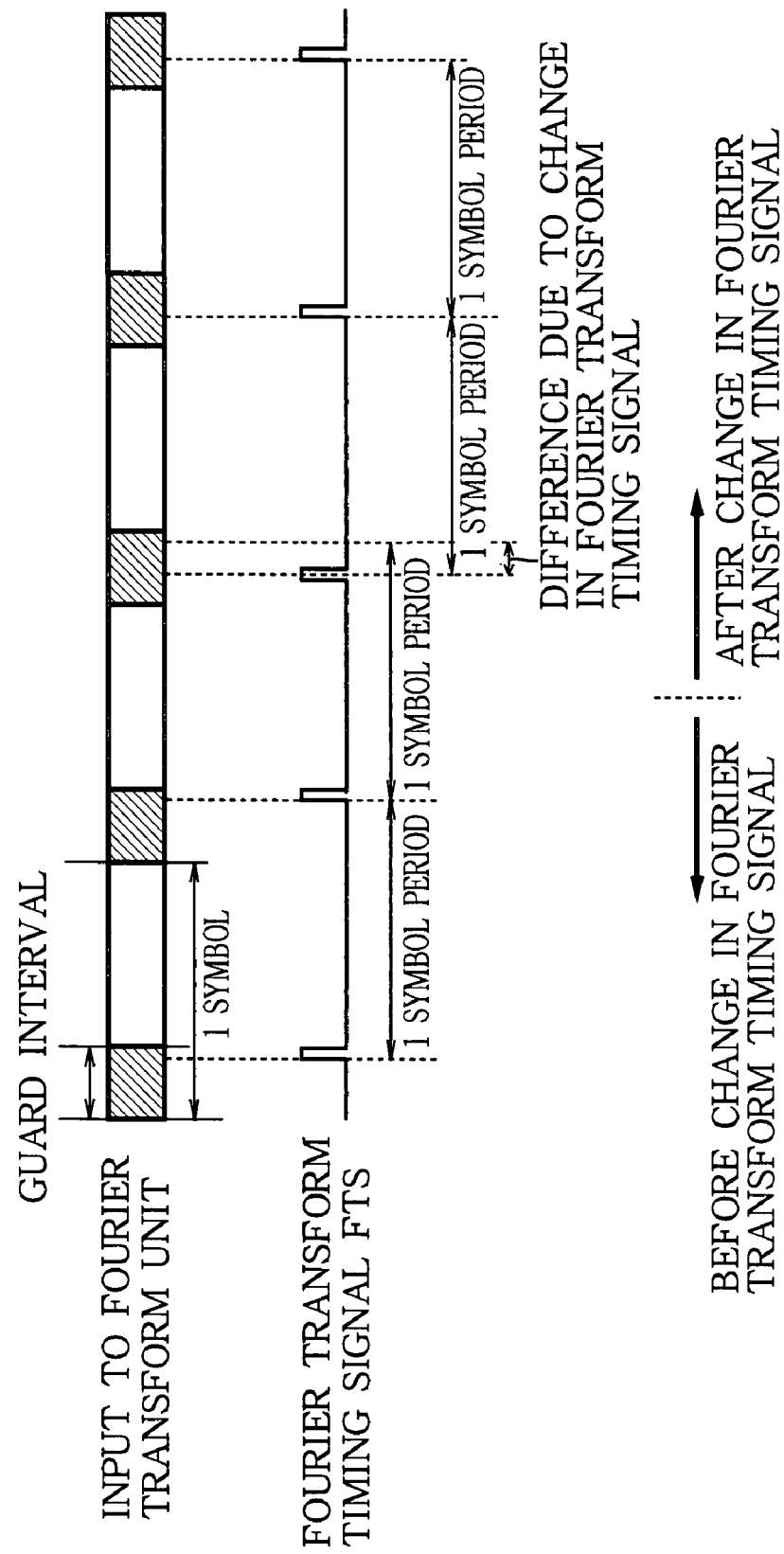

APPARATUS AND METHOD FOR RECEIVING AN ORTHOGONAL FREQUENCY DIVISION MULTIPLEXED SIGNAL

FIELD OF THE INVENTION

The present invention relates to receiving apparatus and a receiving method for receiving an orthogonal frequency division multiplexed signal.

BACKGROUND ART

A conventional receiving apparatus for an orthogonal frequency division multiplexed signal is configured (see, for example, Patent Document 1) so that when it demodulates the carriers modulated by QPSK (Quadrature Phase Shift Keying) or QAM (Quadrature Amplitude Modulation), it estimates the characteristics, more specifically the amount of change in amplitude and phase, of each carrier on the channel (this process will also be referred to as 'channel estimation' below) by using known signals (also referred to as 'pilot signals' below) that are pre-inserted into the transmitted signal, and modifies the amplitude and phase of the carrier (also referred to below as 'equalizing' the carrier) on the basis of the estimated result (the estimated channel characteristic). If the pilot signals are not inserted continuously in a prescribed carrier, that is, if the carriers are inserted at certain intervals of time, then in channel estimation, pilot signals are extracted from a plurality of symbols and a channel estimate for the desired symbol is obtained therefrom.
Patent Document 1: Japanese Patent Application Publication No. 2001-292122 (page 11, FIG. 1)

DISCLOSURE OF THE INVENTION

Problems to be Solved by the Invention

In apparatus for receiving an orthogonal frequency division multiplexed signal, a Fourier transform is carried out to recover the carrier components from a received signal converted in frequency to a prescribed frequency band. It is essential to recover the timing of the Fourier transform correctly. In general, the timing of the Fourier transform must be recovered so that the Fourier transform window does not straddle adjacent symbols. The timings that satisfy this requirement differ depending on the propagation path of the received signal; the greater the difference between the times of arrival of the incoming waves included in the received signal is, the less the degree of freedom of the recovered timing becomes. As it is also possible that the optimal Fourier transform timing may change with the passage of time if the channel environment changes over time, the need arises to vary the Fourier transform timing dynamically. When the Fourier transform timing is changed, however, the phase of each carrier rotates between the symbols preceding and following the change, responsive to the size of the change. A consequent problem is that in the demodulation of an orthogonal frequency division multiplexed signal into which pilot signals are inserted at certain intervals of time, since conventional receiving apparatus uses a plurality of symbols to perform channel estimation for a desired symbol, the signal cannot be demodulated correctly because the channel estimation results for symbols received before and after a change in the timing of the Fourier transform differ from the actual frequency response of the channel (the channel characteristic value).

The present invention addresses the above problem with the object of performing accurate channel estimation and demodulating signals correctly even when the timing of the Fourier transform is changed.

Means of Solution of the Problems

The present invention
is a receiving apparatus for receiving an orthogonal frequency division multiplexed signal in which the unit of transmission is a symbol including a valid symbol and a guard interval, the valid symbol being generated by distributing information over a plurality of carriers and modulating the information onto the carriers, the guard interval being generated by copying the signal waveform of part of the valid symbol, and in which pilot signals with values known at the time of transmission are included in the symbols, the pilot signals being inserted at frequency positions that differ from symbol to symbol, and provides a receiving apparatus comprising:

a Fourier transform means for Fourier-transforming, symbol by symbol, a received signal obtained by performing a frequency conversion to a desired frequency;

a pilot extraction means for extracting pilot signals from the output of the Fourier transform means;

a division means for calculating a channel characteristic value for each pilot signal in each symbol by dividing the value of the pilot signal extracted by the division means by the known value of the pilot signal;

a timing change detection means for detecting that the timing of the Fourier transform in the Fourier transform means has changed;

a time-direction interpolation means for generating first interpolated data by performing interpolation in the time direction with the channel characteristic values for each pilot signal in each symbol output from the division means as original data, responsive to timing changes detected by the timing change detection means, and outputting the generated first interpolated data together with the original data from the division means;

a frequency-direction interpolation means for generating second interpolated data by performing interpolation in the frequency direction, using the output of the time-direction interpolation means as original data, and outputting the generated second interpolated data together with the original data from the time-direction interpolation means; and an equalization means for performing demodulation, carrier by carrier, by dividing the output of the Fourier transform means by the output of the frequency-direction interpolation means; wherein the time-direction interpolation means performs said interpolation by using, from among the temporally preceding and following original data, original data generated using a pilot signal included in a symbol that was Fourier-transformed with the same timing as the symbol in which the first interpolated data to be generated by interpolation are included, without using original data generated using a pilot signal included in a symbol that was Fourier-transformed with a different timing from the symbol in which the first interpolated data to be generated by interpolation are included.

Effect of the Invention

According to the present invention, it becomes possible to reduce interpolation errors in channel estimation values (estimated channel characteristic values) due to Fourier transform timing changes, with the effect that receiving performance can be improved.

BRIEF DESCRIPTION OF THE DRAWINGS

FIG. 2 is a diagram showing an example of scattered pilot insertion.
FIG. 3 is a diagram showing the relationship between the received signal and the Fourier transform timing.
FIG. 4 is a diagram showing scattered pilot arrangements before and after a change in the Fourier transform timing.
FIG. 5 is a block diagram showing a receiving apparatus in a second embodiment of this invention.
FIG. 6 is a diagram showing the input to the Fourier transform unit and the Fourier transform timing signal FTS before and after a change in the Fourier transform timing.

EXPLANATION OF REFERENCE CHARACTERS

Figure 1:
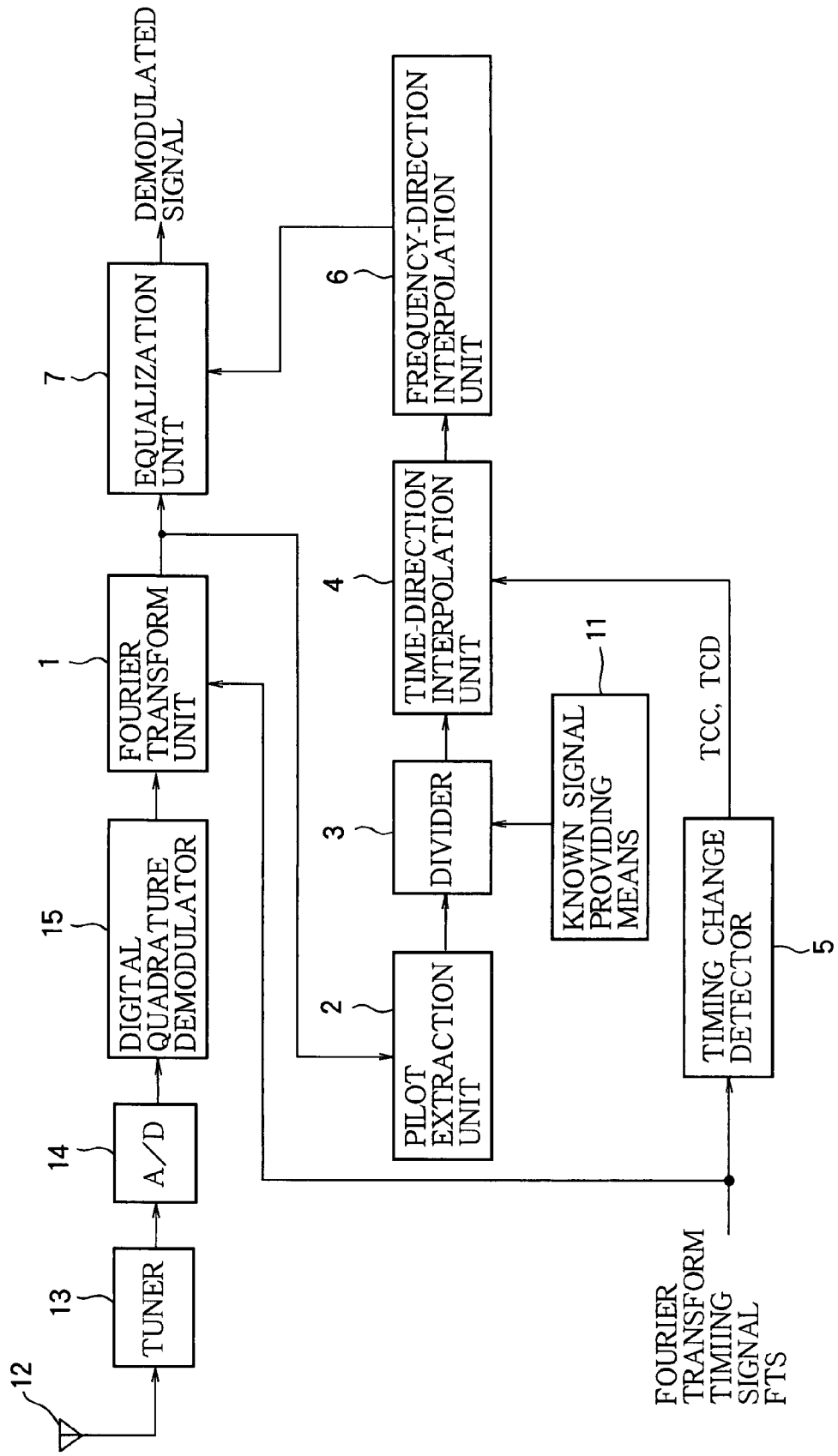
FIG. 1 is a block diagram showing a receiving apparatus in a first embodiment of this invention.

1 Fourier transform unit, 2 pilot extraction unit, 3 divider, 4 time-direction interpolation unit, 5 timing change detector, 6 frequency-direction interpolation unit, 7 equalization unit, 8 timing change amount detector, 9 phase correction unit, 10 time-direction interpolation unit.

BEST MODE OF PRACTICING THE INVENTION

A receiving apparatus in a first embodiment of the invention will be described below, but first a brief explanation, necessary for an understanding the invention, will be given of the transmission technology and receiving technology of the orthogonal frequency division multiplexing system used in this invention.

The technology of digital transmission by orthogonal frequency division multiplexing is a transmission system in which information is modulated onto a plurality of carriers with mutually orthogonal frequencies, which are multiplexed and then transmitted; the use of this technology is advancing in the fields of broadcasting and communications in particular.

In transmission by an orthogonal frequency division multiplexing system, the information to be transmitted (also referred to below as the transmit data) is distributed over a plurality of carriers and digitally modulated onto each carrier by a system such as QPSK (Quadrature Phase Shift Keying), QAM (Quadrature Amplitude Modulation), or multi-valued PSK, generating valid symbols. Signals (also referred to below as pilot signals) with values (amplitude and phase) that are known at the time of transmission are multiplexed in at particular frequencies for use when the carriers are demodulated at the receiver. The multiplexed carriers are orthogonally transformed by an inverse Fourier transform process, converted to a desired transmitting frequency, and transmitted.

Specifically, the transmit data are mapped at the time of transmission according to the modulation system of each carrier and then undergo an inverse discrete Fourier transform. Next, the tail end of the signal (valid symbol) produced by the inverse discrete Fourier transform is copied (duplicated) to the head of a signal to form a guard interval. Due to the guard interval, even when there are delayed waves, if their delay time is less than the guard interval, the signal can be recovered at the receiver without inter-symbol interference. The symbol generated by adding a guard interval to the valid symbol is transmitted as a single unit from the transmitter to a receiver. The pilot signals described above are inserted into the symbols at frequency positions that differ from symbol to symbol.

In orthogonal frequency division multiplexing, since the carriers all have mutually orthogonal frequencies, if the carrier frequency is recovered correctly at the receiver, the transmit data can also be recovered correctly. Therefore, a demodulator receiving an orthogonal frequency division multiplexed signal demodulates the received signal by performing quadrature demodulation to convert the received signal to a complex-valued digital signal in a desired frequency band, removing the guard intervals, performing a Fourier transform to convert the signal to the frequency domain, and then detecting the signal.

When each carrier in the orthogonal frequency division multiplexed signal transmits data by a modulation system such as multi-valued PSK or multi-valued QAM, pilot signals for use in demodulation of the carriers may be inserted into the carrier periodically in the frequency direction and the time direction. For example, scattered pilots are periodically inserted in the Japanese terrestrial digital TV broadcasting system. In demodulating the carriers, an orthogonal frequency division multiplexed signal receiver estimates channel characteristic from the scattered pilots.

FIG. 2 is a diagram showing an example of scattered pilot insertion. In the example in FIG. 2, a scattered pilot is inserted in one out of every twelve carriers in the frequency direction, and in one out of every four symbols in the time direction. The insertion position is changed by three carriers per symbol so that the same frequency positions recur at every fourth symbol. A symbol is a collection of carriers that have undergone the inverse Fourier transform with the same timing in the transmitter.

When pilot signals are inserted as in FIG. 2, the scattered pilots are generally extracted from a plurality of symbols, and channel estimates for the desired symbol are obtained by interpolation in the time direction and frequency direction. If $c_{m,n}$ is the nth transmitted carrier in the mth symbol, $h_{m,n}$ is the corresponding channel characteristic (frequency response), and $r_{m,n}$ is the Fourier transform output of the nth carrier in the mth symbol at the receiver, when a signal from which the guard interval has been accurately removed at the receiver is Fourier-transformed, if noise components are ignored, the following relation (1) holds true.

$$r_{m,n} = h_{m,n} c_{m,n} \qquad (1)$$

Let it now be assumed that a scattered pilot is inserted at the Nth carrier in the Mth symbol. If this carrier is denoted $s_{M,N}$, then if scattered pilots are inserted as in FIG. 2, the pilot signals can be represented as follows (2).

$$s_{M+p, N+3p+12q}, \begin{cases} p = \ldots, -3, -2, -1, 0, 1, 2, 3, \ldots \\ q = \ldots, -3, -2, -1, 0, 1, 2, 3, \ldots \end{cases} \qquad (2)$$

Suppose that the Mth symbol (the carriers enclosed by the solid line in FIG. 2) is demodulated at a time t=T(M) at the receiver. As a method of performing channel estimation for the Mth symbol, a method will now be described in which the scattered pilots are divided by known signals (the values of pilot signals generated from a generator polynomial or generating rule stored in the receiving apparatus, or known values of the pilot signals stored in the receiving apparatus) and linear interpolation is carried out on the results in the time direction, followed by interpolation in the frequency direction by a FIR (Finite Impulse Response) filter.

If $h'_{m,n}$ denotes the result (the estimated channel characteristic value) when the output of the Fourier transform of a scattered pilot is divided by the known signal $s_{m,n}$ (the known value of the pilot signal), then $h'_{m,n}$ can be expressed as in the following equation (3). The term $z_{m,n}$ in this equation represents a noise component added to the nth carrier in the mth symbol.

$$h'_{m,n} = (r_{m,n}/s_{m,n}) = h_{m,n} s_{m,n} + z_{m,n} \approx h_{m,n} \quad (3)$$

First, estimated channel characteristic values are interpolated into each symbol by linear interpolation of the estimated channel characteristic values $h'_{m,n}$ in the time direction. Scattered pilots are inserted into the Mth symbol in one out of every twelve carriers in the frequency direction, but by interpolating in the time direction it is possible to calculate channel characteristic values $h'_{m,n}$ for one out of every three carriers.

It will be assumed below that interpolated data are generated by linear interpolation using the original data most closely preceding and most closely following the data to be generated by interpolation (the interpolated data).

It will be assumed that the Nth carrier of the Mth symbol is a scattered pilot, which will be denoted $S_{M,N}$. The channel characteristic value estimated for the Nth carrier of the Mth symbol then becomes $h'_{M,N}$. The estimated channel characteristic value of the N+3rd carrier is calculated by use of the N+3rd carrier in the M−3rd symbol and the N+3rd carrier in the M+1st symbol, namely $S_{M-3,N+3}$ and $S_{M+1,N+3}$, as in the following equation (4).

$$h'_{M,N+3} = (1/4)h'_{M-3,N+3} + (3/4)h'_{M+1,N+3} \quad (4)$$

The estimated channel characteristic value of the N+6th carrier is calculated by use of the N+6th carrier in the M−2nd symbol and the N+6th carrier in the M+2nd symbol, namely $S_{M-2,N+6}$ and $S_{M+2,N+6}$, as in the following equation (5).

$$h'_{M,N+3} = (1/2)h'_{M-2,N+6} + (1/2)h'_{M+2,N+6} \quad (5)$$

The estimated channel characteristic value of the N+9th carrier is calculated by use of the N+9th carrier in the M−1st symbol and the N+9th carrier in the M+3rd symbol, namely $S_{M-1,N+9}$ and $S_{M+3,N+9}$, as in the following equation (6).

$$h'_{M,N+3} = (3/4)h'_{M-1,N+9} + (1/4)h'_{M+3,N+9} \quad (6)$$

The channel characteristic value of one out of every three carriers in the Mth symbol can be calculated by methods similar to the above. The channel characteristic values obtained for the Mth symbol by interpolation in the time direction can accordingly be expressed as follows (7).

$$\{\ldots, h'_{M,N-9}, h'_{M,N-6}, h'_{M,N-3}, h'_{M,N}, h'_{M,N+3}, h'_{M,N+6}, h'_{M,N+9}, h'_{M,N+12}, \ldots\} \quad (7)$$

In order to estimate channel characteristic values for all carriers, it suffices to perform interpolation in the frequency direction on the channel characteristic values after interpolation in the time direction. The interpolation in the frequency direction can be performed by a FIR filter, for example. By dividing the Fourier transform output by the channel characteristic values obtained from interpolation in the time direction and in the frequency direction, all carriers can be demodulated as shown in the following equation (8). If there is no noise and the estimated channel characteristic value is correct, then the demodulated result is equal to the transmit data.

$$c'_{M,n} = (r_{M,n}/h'_{M,n}) = (h_{M,n} c_{M,n} + z_{M,n})/h'_{M,n} \quad (8)$$

To demodulate one symbol by the method above, it is necessary to use the scattered pilots in a total of seven symbols (surrounded by a dotted line in FIG. 2), including the symbol being demodulated, the three preceding symbols, and the three following symbols. If a nonlinear interpolation method that uses the scattered pilots in more symbols in the time direction is employed, even more symbols are necessary for demodulating one symbol.

Next, the effect of the timing of the Fourier transform of a signal in the time domain on the output of the Fourier transform will be described. Equation (1) represented the carriers in a Fourier-transformed signal from which the guard intervals are correctly removed in the receiver. The (starting) timing of the Fourier transform is indicated by reference character A in FIG. 3, which shows a one-symbol portion of a signal in the time domain. FIG. 3 also indicates both the Fourier transform timing and the interval that is processed by the Fourier transform.

Next, a case in which the Fourier transform timing is offset forward of timing A will be described. If the Fourier transform timing is in the guard interval that precedes timing A, and the Fourier transform can be carried out and the transmit data can be demodulated without inter-symbol interference. When the Fourier transform is carried out (started) at the timing represented by reference character B, the resulting Fourier transform output can be represented as in the following equation (9) based on the difference $\tau$ between the Fourier transform timings A and B, and the carrier frequency spacing $f_0$.

$$r_{m,n} = h_{m,n} c_{m,n} \exp[j 2\pi n f_0 \tau] \quad (9)$$

As can be seen from a comparison of equations (9) and (1), a phase rotation determined by $\tau$ and the carrier frequency f is added to each carrier due to the change in the Fourier transform timing. In equation (9), the carrier frequency f is represented by the product of the carrier frequency spacing $f_0$ and n. Therefore, when interpolation in the time direction over a plurality of symbols is necessary in order to estimate a channel characteristic value, if the Fourier transform timing is changed, the interpolation result does not have the desired value. Consequently, the channel characteristic value cannot be correctly estimated, errors occur in the demodulation results, and receiving performance deteriorates.

The purpose of this invention is to solve this problem.

First Embodiment

FIG. 1 is a block diagram showing a receiving apparatus according to a first embodiment of this invention. The illustrated receiving apparatus, which receives an orthogonal frequency division multiplexed signal in which pilot signals with known values (amplitude and phase) have been inserted, has a known signal providing means 11, a tuner 13 connected to an antenna 12, an A/D converter 14, a digital quadrature demodulator 15, a Fourier transform unit 1, a pilot extraction unit 2, a divider 3, a time-direction interpolation unit 4, a timing change detector 5, a frequency-direction interpolation unit 6, and an equalization unit 7; the outputs of the equalization unit 7 are the demodulated signals of the carriers.

Next the operation will be described.

The known signal providing means 11, which supplies the values (amplitude and phase) of the pilot signals when they are transmitted, includes a memory storing the transmitted values themselves, for example, or a memory storing a generator polynomial or generating rule that generates the transmitted values.

A digital television broadcast signal broadcast from a broadcasting station is received by the antenna 12 of the receiving apparatus and supplied as an RF signal to the tuner 13. The tuner 13 down-converts the RF signal to an IF signal; the A/D converter 14 digitizes the IF signal from the tuner 13. The digital quadrature demodulator 15 orthogonally demodulates the digitized IF signal and outputs a baseband OFDM signal.

The received signal supplied to the Fourier transform unit 1 has accordingly been converted to a desired frequency; it is a time-domain signal obtained by frequency conversion of the received orthogonal frequency division multiplexed signal to a desired frequency.

The Fourier transform unit 1 performs a Fourier transform on each symbol of the supplied signal with a predefined timing by performing a Fourier transform on the signal interval defined by a Fourier transform timing signal FTS, and outputs the result of the Fourier transform.

The pilot extraction unit 2 receives the output from the Fourier transform unit 1 as input, extracts the pilot signals inserted at the transmitter, and outputs the extracted signals. The output from the pilot extraction unit 2 is input to the divider 3.

The divider 3 calculates a channel characteristic value (frequency response) from each pilot signal in each symbol, by dividing the output from the pilot extraction unit 2 by the known pilot signal (the signal representing the known value) output from the known signal providing means 11.

The timing change detector 5 receives the Fourier transform timing signal FTS as input, detects whether or not the timing of the Fourier transform has changed, generates a signal TCC indicating the detected result, generates a control signal TCD indicating, in the symbols used by the time-direction interpolation unit 4, the locations of the symbol boundaries at which the Fourier transform timing was changed, and outputs these signals TCC and TCD to the time-direction interpolation unit 4.

The time-direction interpolation unit 4 performs interpolation in the time direction using the output from the divider 3 as original data, responsive to the TCC and TCD (representing timing change detected in the timing change detector 5) output from the timing change detector 5, generates interpolated data, and outputs the generated interpolated data together with the original data (output from the divider 3).

The time-direction interpolation unit performs interpolation by using, from among the temporally preceding and following original data, original data generated using a pilot signal included in a symbol that was Fourier-transformed with the same timing as the symbol in which the interpolated data to be generated by interpolation are included, without using original data generated using a pilot signal included in a symbol that was Fourier-transformed with a different timing from the symbol in which the interpolated data to be generated by interpolation are included.

For example, the time-direction interpolation unit generates the interpolated data by performing interpolation using both the original data most closely preceding and the original data most closely following the interpolated data to be generated by interpolation when these two original data were generated using pilot symbols included in symbols that were Fourier-transformed with mutually identical timings, and generates (the value of) the interpolated data, when one of the original data most closely preceding and the original data most closely following the interpolated data to be generated by interpolation was generated using a pilot signal included in a symbol that was Fourier-transformed with a timing differing from that of the symbol in which the interpolated data to be generated by interpolation are included and another one of the two original data was generated using a pilot signal included in a symbol that was Fourier-transformed with the same timing as that of the symbol in which the interpolated data to be generated by interpolation are included, by selecting as the interpolated data the original data generated using the pilot signal included in the symbol that was Fourier-transformed with the same timing.

This method of interpolation is referred to in this specification as 'interpolation by selection of neighboring points', or simply 'selection'.

Interpolation is performed, for example, as linear interpolation, by using a FIR filter, for example.

The frequency-direction interpolation unit 6 generates interpolated data by performing interpolation in the frequency direction, using the output of the time-direction interpolation unit 4 as original data, and outputs the generated interpolated data together with the original data (the output of the time-direction interpolation unit 4). The time-direction interpolation unit 4 comprises, for example, a FIR filter.

Through interpolation in the frequency direction, estimated channel characteristic values can be obtained for all carriers in each symbol.

The equalization unit 7 divides the output from the Fourier transform unit 1 by the corresponding output from the frequency-direction interpolation unit 6, that is, by the estimated channel characteristic values, and outputs the result as a demodulated signal of the carrier.

Next, the operation of the timing change detector 5 and the time-direction interpolation unit 4 will be described in detail. In the following description, it is assumed that the scattered pilots are arranged as shown in FIGS. 2 and 4. FIG. 4 is a diagram showing a carrier in which scattered pilots are inserted in a manner similar to FIG. 2. It will also be assumed that at the receiver, the symbols up to the M−1st symbol are Fourier-transformed with Fourier transform timing A, and the Mth and subsequent symbols are Fourier-transformed with Fourier transform timing B (which precedes timing A). If linear interpolation is performed using pilot signals in seven symbols in the interpolation processing in the time direction to calculate the channel characteristic values, then the symbols for which all seven symbols have been Fourier-transformed with Fourier transform timing A are the symbols up to the M−4th symbol. Similarly, the symbols for which all seven symbols have been Fourier-transformed with Fourier transform timing B are the symbols from the M+3rd symbol onward. Channel characteristic values are estimated for these symbols by carrying out interpolation in the time direction by the conventional method in the time-direction interpolation unit 4.

Next, descriptions will be given for the symbols from the M−3rd symbol to the M+2nd symbol. For these symbols, the seven consecutive symbols include signals that have been Fourier-transformed with Fourier transform timing A and signals that have been Fourier-transformed with Fourier transform timing B. Accordingly, when the pilot signals inserted in these symbols are used for interpolation in the time direction, if time-direction interpolation were to be carried out using pilot signals that had been Fourier-transformed with different Fourier transform timings, incorrect interpolation results would be calculated. Time-direction interpolation is therefore carried out by interpolating or selecting the outputs of the divider 3, depending on the Fourier transform timing that was used in the Fourier transform of the signal for which a channel characteristic value (estimated value) is being calculated.

First, the operation of the time-direction interpolation unit 4 in estimating the channel characteristic values of the M−3rd symbol will be described. The pilot signals that provide the original data for interpolation in the time direction are found from the M−6th symbol to the Mth symbol, of which the M−6th to M−1st symbols were Fourier-transformed with Fourier transform timing A. Interpolation between the pilot signals included in the M−6th and M−2nd symbols (interpolation using these signals as original data) and interpolation between the pilot signals included in the M−5th and M−1st symbols are therefore carried out by conventional linear interpolation. Channel characteristic values for the pilot signals included in the M−3rd symbol are output from the divider 3, so interpolation processing is unnecessary; the unaltered outputs of the divider 3 (the original data) are used. Interpolation is not performed between the pilot signals included in the M−4th and Mth symbols because of their differing Fourier transform timings; the output of the divider 3 for the pilot signal included in the M−4th symbol is used as the output of the time-direction interpolation unit 4, because the same Fourier transform timing was used for it as for the M−3rd symbol, which is the symbol for which an estimate of the channel characteristic value is being made (the symbol for which the channel characteristic value is to be calculated).

The above operations will now be shown specifically. It will be assumed that the Nth carrier in the Mth symbol is a scattered pilot $s_{M,N}$ and that its estimated channel characteristic value is $h'_{M,N}$. In the M−3rd symbol, for example, $S_{M-3,N+3}$ is a scattered pilot. The channel characteristic value of the N+3rd carrier is accordingly output from the divider 3 with no need for interpolation, and the unaltered output of the divider 3 is used as the output of the time-direction interpolation unit 4. For the N+6th carrier, linear interpolation is carried out using the pilot signals included in the M−6th and M−2nd symbols as in the following equation (10).

$$h'_{M-3,N+6}=(\tfrac{1}{4})h'_{M-6,N+6}+(\tfrac{3}{4})h'_{M-2,N+6} \tag{10}$$

For the N+9th carrier, linear interpolation is carried out using the N+9th carrier in the M−5th symbol and the N+9th carrier in the M−1st symbol as in the following equation (11).

$$h'_{M-3,N+9}=(\tfrac{1}{2})h'_{M-5,N+9}+(\tfrac{1}{2})h'_{M-1,N+9} \tag{11}$$

For the Nth carrier, however, to perform interpolation using only pilot signals included in symbols that were Fourier-transformed with the same timing, without using pilot signals included in symbols that were Fourier-transformed with a different timing, the unaltered output of the divider 3 for the Nth carrier in the M−4th symbol is used as the output of the time-direction interpolation unit 4 as in the following equation (12).

$$h'_{M-3,N}=h'_{M-4,N} \tag{12}$$

Values are obtained for one out of every three carriers in the M−3rd symbol by interpolation in the time direction or selection of the outputs of the divider 3 by the same method as above to produce the output of the time-direction interpolation unit 4.

Next, the operation of the time-direction interpolation unit 4 in estimating the channel characteristic values of the M−2nd symbol will be described. The pilot signals that provide the original data for interpolation in the time direction are found from the M−5th symbol to the M+1st symbol, of which the M−5th to M−1st symbols were Fourier-transformed with Fourier transform timing A. Interpolation between the pilot signals included in the M−5th and M−1st symbols is therefore carried out by conventional linear interpolation. Channel characteristic values for the pilot signals included in the M−2nd symbol are output from the divider 3, so interpolation processing is unnecessary; the unaltered outputs of the divider 3 (the original data) are used. Interpolation is not performed between the pilot signals included in the M−4th and Mth symbols and between the pilot signals included in the M−3rd and M+1st symbols, because of their differing Fourier transform timings; the outputs of the divider 3 for the pilot signals included in the M−4th and M−3rd symbols are used as the output of the time-direction interpolation unit 4, because the same Fourier transform timing was used for them as for the M−2nd symbol, which is the symbol for which an estimate of the channel characteristic value is being made (the symbol for which the channel characteristic value is to be calculated).

The above operations will now be shown specifically. It will be assumed that the Nth carrier in the Mth symbol is a scattered pilot $s_{M,N}$ and that its estimated channel characteristic value is $h'_{M,N}$. In the M−2nd symbol, for example, $s_{M-2,N+6}$ is a scattered pilot. The channel characteristic value of the N+6th carrier is accordingly output from the divider 3 with no need for interpolation, and the unaltered output of the divider 3 is used as the output of the time-direction interpolation unit 4. For the N+9th carrier, linear interpolation is carried out using the pilot signals included in the M−5th and M−1st symbols as in the following equation (13).

$$h'_{M-2,N+9}=(\tfrac{1}{4})h'_{M-5,N+9}+(\tfrac{3}{4})h'_{M-1,N+9} \tag{13}$$

For the Nth carrier, however, to perform interpolation using only pilot signals included in symbols that were Fourier-transformed with the same timing, the unaltered output of the divider 3 for the Nth carrier in the M−4th symbol is used as the output of the time-direction interpolation unit 4 as in the following equation (14)

$$h'_{M-2,N}=h'_{M-4,N} \tag{14}$$

For the N+3th carrier, in order to perform interpolation using only pilot signals included in symbols that were Fourier-transformed with the same timing, the unaltered output of the divider 3 for the N+3rd carrier in the M−3rd symbol is used as the output of the time-direction interpolation unit 4 as in the following equation (15).

$$h'_{M-2,N+3}=h'_{M-3,N+3} \tag{15}$$

Values are obtained for one out of every three carriers in the M−2nd symbol by interpolation in the time direction or selection of the outputs of the divider 3 by the same method as above to produce the output of the time-direction interpolation unit 4.

Next, the operation of the time-direction interpolation unit 4 in estimating the channel characteristic values of the M−1st symbol will be described. The pilot signals that provide the original data for interpolation in the time direction are found from the M−4th symbol to the M+2nd symbol, of which the M−4th to M−1st symbols were Fourier-transformed with Fourier transform timing A. Channel characteristic values for the pilot signals included in the M−1st symbol are output from the divider 3, so interpolation processing is unnecessary; the unaltered outputs of the divider 3 are used. Interpolation is not performed between the pilot signals included in the M−4th symbol and Mth symbols, between the pilot signals included in the M−3rd symbol and M+1st symbols, and between the pilot signals included in M−2nd and M+2nd symbols because of their differing Fourier transform timings; the outputs of the divider 3 for the pilot signals included in the M−4th, M−3rd, and M−2nd symbols are used as the output of the time-direction interpolation unit 4, because the same Fourier transform timing was used for them as for the M−1st symbol, which is the symbol for which an estimate of the channel characteristic value is being made (the symbol for which the channel characteristic value is to be calculated).

The above operations will now be shown specifically. As in the above explanation, it will be assumed that the Nth carrier in the Mth symbol is a scattered pilot $s_{M,N}$ and that its estimated channel characteristic value is $h'_{M,N}$. In the M−1st symbol, for example, $s_{M-1,N+9}$ is a scattered pilot. The channel characteristic value of the N+9th carrier is accordingly output from the divider 3 with no need for interpolation, and the unaltered output of the divider 3 is used as the output of the time-direction interpolation unit 4.

For the Nth carrier, however, to perform interpolation using only pilot signals included in symbols that were Fourier-transformed with the same timing, the unaltered output of the divider 3 for the Nth carrier in the M−4th symbol is used as the output of the time-direction interpolation unit 4 as in the following equation (16).

$$h'_{M-1,N}=h'_{M-4,N} \quad (16)$$

For the N+3rd carrier, in order to perform interpolation using only pilot signals included in symbols that were Fourier-transformed with the same timing, the unaltered output of the divider 3 for the N+3rd carrier in the M−3rd symbol is used as the output of the time-direction interpolation unit 4 as in the following equation (17).

$$h'_{M-1,N+3}=h'_{M-3,N+3} \quad (17)$$

For the N+6th carrier, in order to perform interpolation using only pilot signals included in symbols that were Fourier-transformed with the same timing, the unaltered output of the divider 3 for the N+6th carrier in the M−2nd symbol is used as the output of the time-direction interpolation unit 4 as in the following equation (18).

$$h'_{M-1,N+6}=h'_{M-2,N+6} \quad (18)$$

Values are obtained for one out of every three carriers in the M−1st symbol by interpolation in the time direction or selection of the outputs of the divider 3 by the same method as above to produce the output of the time-direction interpolation unit 4.

Next, the operation of the time-direction interpolation unit 4 in estimating the channel characteristic values of the Mth symbol will be described. The pilot signals that provide the original data for interpolation in the time direction are found from the M−3rd symbol to the M+3rd symbol, of which the Mth to M+3rd symbols were Fourier-transformed with Fourier transform timing B. Channel characteristic values for the pilot signals included in the Mth symbol are output from the divider 3, so interpolation processing is unnecessary; the unaltered outputs of the divider 3 are used. Interpolation is not performed between the pilot signals included in the M−3rd and M+1st symbols, the pilot signals included in the M−2nd and M+2nd symbols, and the pilot signals included in the M−1st and M+3rd symbols, because of their differing Fourier transform timings; the outputs of the divider 3 for the pilot signals included in the M+1st, M+2nd, and M+3rd symbols are used as the output of the time-direction interpolation unit 4, because the same Fourier transform timing was used for them as for the Mth symbol, which is the symbol for which an estimate of the channel characteristic value is being made (the symbol for which the channel characteristic value is to be calculated).

The above operations will now be shown specifically. It will be assumed that the Nth carrier in the Mth symbol is a scattered pilot $s_{M,N}$ and that its estimated channel characteristic value is $h'_{M,N}$. In the Mth symbol, the channel characteristic value of the Nth carrier is accordingly output from the divider 3 with no need for interpolation, and the unaltered output of the divider 3 is used as the output of the time-direction interpolation unit 4.

For the N+3rd carrier, however, to perform interpolation using only pilot signals included in symbols that were Fourier-transformed with the same timing, the unaltered output of the divider 3 for the N+3rd carrier in the M+1st symbol is used as the output of the time-direction interpolation unit 4 as in the following equation (19).

$$h'_{M,N+3}=h'_{M+1,N+3} \quad (19)$$

For the N+6th carrier, in order to perform interpolation using only pilot signals included in symbols that were Fourier-transformed with the same timing, the unaltered output of the divider 3 for the N+6th carrier in the M+2nd symbol is used as the output of the time-direction interpolation unit 4 as in the following equation (20).

$$h'_{M,N+6}=h'_{M+2,N+6} \quad (20)$$

For the N+9th carrier, in order to perform interpolation using only pilot signals included in symbols that were Fourier-transformed with the same timing, the unaltered output of the divider 3 for the N+9th carrier in the M+3rd symbol is used as the output of the time-direction interpolation unit 4 as in the following equation (21).

$$h'_{M,N+9}=h'_{M+3,N+9} \quad (21)$$

Values are obtained for one out of every three carriers in the Mth symbol by interpolation in the time direction or selection of the outputs of the divider 3 by the same method as above to produce the output of the time-direction interpolation unit 4.

Next, the operation of the time-direction interpolation unit 4 in estimating the channel characteristic values of the M+1st symbol will be described. The pilot signals that provide the original data for interpolation in the time direction are found from the M−2nd symbol to the M+4th symbol, of which the Mth to M+4th symbols were Fourier-transformed with Fourier transform timing B. Interpolation between the pilot signals included in the Mth and M+4th symbols is therefore carried out by conventional linear interpolation. Channel characteristic values for the pilot signals included in the M+1st symbol are output from the divider 3, so interpolation processing is unnecessary; the unaltered outputs of the divider 3 are used. Interpolation is not performed between the pilot signals included in the M−2nd and M+2nd symbols, and between the pilot signals included in the M−1st and M+3rd symbols, because of their differing Fourier transform timings; the outputs of the divider 3 for the pilot signals included in the M+2nd and M+3rd symbols are used as the output of the time-direction interpolation unit 4, because the same Fourier transform timing was used for them as for the M+1st symbol, which is the symbol for which an estimate of the channel characteristic value is being made (the symbol for which the channel characteristic value is to be calculated).

The above operations will now be shown specifically. As in the above explanation, it will be assumed that the Nth carrier in the Mth symbol is a scattered pilot $S_{M,N}$ and that its estimated channel characteristic value is $h'_{M,N}$. In the M+1st symbol, the channel characteristic value of the N+3rd carrier is accordingly output from the divider 3 with no need for interpolation, and the unaltered output of the divider 3 is used as the output of the time-direction interpolation unit 4. For the Nth carrier, linear interpolation is carried out using pilot signals included in the Mth and M+4th symbols as shown in the following equation (22).

$$h'_{M+1,N}=(3/4)h'_{M,N}+(1/4)h'_{M+4,N} \quad (22)$$

For the N+6th carrier, however, to perform interpolation using only pilot signals included in symbols that were Fourier-transformed with the same timing, the unaltered output of the divider 3 for the N+6th carrier in the M+2nd symbol is used as the output of the time-direction interpolation unit 4 as in the following equation (23).

$$h'_{M+1,N+6} = h'_{M+2,N+6} \quad (23)$$

For the N+9th carrier, in order to perform interpolation using only pilot signals included in symbols that were Fourier-transformed with the same timing, the unaltered output of the divider 3 for the N+9th carrier in the M+3rd symbol is used as the output of the time-direction interpolation unit 4 as in the following equation (24).

$$h'_{M+1,N+9} = h'_{M+3,N+9} \quad (24)$$

Values are obtained for one out of every three carriers in the M+1st symbol by interpolation in the time direction or selection of the outputs of the divider 3 by the same method as above to produce the output of the time-direction interpolation unit 4.

Next, the operation of the time-direction interpolation unit 4 in estimating the channel characteristic values of the M+2nd symbol will be described. The pilot signals that provide the original data for interpolation in the time direction are found from the M−1st symbol to the M+5th symbol, of which the Mth to M+5th symbols were Fourier-transformed with Fourier transform timing B. Interpolation between the pilot signals included in the Mth and M+4th symbols and between the pilot signals included in the M+1st and M+5th symbols is therefore carried out by conventional linear interpolation. Channel characteristic values for the pilot signals included in the M+2nd symbol are output from the divider 3, so interpolation processing is unnecessary; the unaltered outputs of the divider 3 are used. Interpolation is not performed between the pilot signals included in the M−1st and M+3rd symbols because of their differing Fourier transform timings; the output of the divider 3 for the pilot signal included in the M+3rd symbol is used as the output of the time-direction interpolation unit 4, because the same Fourier transform timing was used for it as for the M+2nd symbol, which is the symbol for which an estimate of the channel characteristic value is being made (the symbol for which the channel characteristic value is to be calculated).

The above operations will now be shown specifically. As in the above explanation, it will be assumed that the Nth carrier in the Mth symbol is a scattered pilot $s_{M,N}$ and that its estimated channel characteristic value is $h'_{M,N}$. In the M+2nd symbol, the channel characteristic value of the N+6th carrier is accordingly output from the divider 3 with no need for interpolation, and the unaltered output of the divider 3 is used as the output of the time-direction interpolation unit 4. For the Nth carrier, linear interpolation using the pilot signals included in the Mth and M+4th symbols is performed as in the following equation (25).

$$h'_{M+2,N} = (1/2)h'_{M,N} + (1/2)h'_{M+4,N} \quad (25)$$

For the N+3rd carrier, linear interpolation using the pilot signals included in the M+1st and M+5th symbols is performed as in the following equation (26).

$$h'_{M+2,N+3} = (3/4)h'_{M+1,N+3} + (1/4)h'_{M+5,N+3} \quad (26)$$

For the N+9th carrier, however, to perform interpolation using only pilot signals included in symbols that were Fourier-transformed with the same timing, the unaltered output of the divider 3 for the N+9th carrier in the M+3rd symbol is used as the output of the time-direction interpolation unit 4 as in the following equation (27).

$$h'_{M+2,N+9} = h'_{M+3,N+9} \quad (27)$$

Values are obtained for one out of every three carriers in the M+2nd symbol by interpolation in the time direction or selection of the outputs of the divider 3 by the same method as above to produce the output of the time-direction interpolation unit 4.

The reason why the time-direction interpolation unit 4 can estimate channel characteristic values by outputting a signal selected from the outputs of the divider 3 instead of by interpolation in the time direction is based on the idea that this method can provide an approximate calculation of the channel characteristic value (frequency response) provided the change in the channel over time is sufficiently moderate relative to the symbol length.

As shown above, a receiving apparatus according to the first embodiment of the invention detects changes in the Fourier transform timing signal FTS, and in the estimation of channel characteristic values for the preceding and following symbols, switches the interpolation process in the time direction so as to perform linear interpolation or selection, whichever method is appropriate, enabling incorrect interpolation in the time direction due to changes in the Fourier transform timing to be reduced, so channel characteristics can be estimated more accurately than by previous methods, enabling the receiving performance of the receiver to be improved.

In the example above, interpolation was carried out by using the original data most closely preceding and the original data most closely following the interpolated data to be generated by interpolation, but interpolation may be carried out using other data as the original data. A case in which the interpolation process in the time direction was implemented by linear interpolation using channel characteristic values (frequency responses) calculated from two pilot signals was shown, but the interpolation process in the time direction may be carried out by an interpolation process using channel characteristic values (the outputs of the divider 3) calculated from three or more pilot signals. Interpolation by a FIR filter, spline interpolation, and various other types of signal processing may be considered for the interpolation process in this case. Regardless of the type of interpolation process carried out, however, when the Fourier transform timing is changed, the channel characteristic value (output of the divider 3) of a pilot signal included in a symbol that was Fourier-transformed with the same timing as the symbol including the carrier for which a characteristic value is to be calculated by interpolation is selected and output by a similar method. If there are a plurality of selectable pilot signals, the pilot signal in the symbol temporally closest to the symbol for which a channel characteristic value is to be estimated (the symbol for which a channel characteristic value is to be obtained by interpolation) should be used.

Second Embodiment

In the first embodiment, when the Fourier transform timing was changed, the interpolation processing carried out in the time direction to estimate the channel characteristic values was implemented by switching between an interpolation process using two or more signals and a selection process that selected one of the two signals. Next, an embodiment will be described in which the carrier phase rotation generated in the Fourier transform output when the timing of the Fourier transform is changed is appropriately corrected, and the corrected results are used to estimate the channel characteristic values by interpolation processing in the time direction.

FIG. 5 is a block diagram showing a receiving apparatus in this second embodiment. In this figure, the components denoted by reference numerals 11, 12, 13, 14, 15, 1, 2, 3, 5, 6, and 7 are the same as those shown in the first embodiment. The receiving apparatus of the second embodiment comprises a time-direction interpolation unit 10 instead of the time-direction interpolation unit 4 in the first embodiment, and additionally comprises a timing change amount detector 8 and a phase correction unit 9.

The operation will now be described. The components denoted by reference numerals 11, 12, 13, 14, 15, 1, 2, 3, 5, 6, and 7 operate as they did in the first embodiment.

The timing change detector 5 receives the Fourier transform timing signal FTS as input, detects whether or not the timing of the Fourier transform has changed, generates a signal TCC indicating the detected result, and outputs the TCC signal to the timing change amount detector 8. The timing change detector 5 also generates a control signal TCD indicating, in the symbols used in the time-direction interpolation unit 10, the locations of the symbol boundaries at which the Fourier transform timing was changed, and outputs the TCD signal to the time-direction interpolation unit 10.

The timing change amount detector 8 detects the amount of change in the (starting) timing of the Fourier transform.

The phase correction unit 9 modifies the phase of the channel characteristic values output from the divider 3 responsive to the amount of timing change output from the timing change amount detector 8, and outputs the phase-modified channel characteristic values and the channel characteristic values before the phase modification (the output from the divider 3).

The time-direction interpolation unit 10 generates interpolated data by performing interpolation in the time direction with the outputs from the phase correction unit 9 (the phase-modified channel characteristic values and the channel characteristic values before phase modification) as original data, responsive to the control signal TCD (representing timing changes detected by the timing change detector 5) output from the timing change detector 5, and outputs the data generated by interpolation (interpolated data) together with the original data (output from the phase correction unit 9). The time-direction interpolation unit 10 comprises a FIR filter, for example.

For example, the time-direction interpolation unit generates the interpolated data by performing interpolation using both the original data (with a phase modification if necessary) most closely preceding and the original data (with a phase modification if necessary) most closely following the interpolated data to be generated by interpolation.

The frequency-direction interpolation unit 6 generates interpolated data by performing interpolation in the frequency direction, using the output of the time-direction interpolation unit 10 as original data, and outputs the data generated by interpolation (interpolated data) together with the original data (the output of the time-direction interpolation unit 10). The time-direction interpolation unit 4 comprises, for example, a FIR filter.

Through interpolation in the frequency direction, estimated channel characteristic values can be obtained for all carriers in each symbol.

The phase correction unit 9 compensates for the phase rotations of the carriers caused by changes in the timing of the Fourier transform, thereby enabling interpolation to be performed in the time direction between pilot signals in symbols before and after a change in Fourier transform timing.

The timing change amount detector 8 receives the TCC signal and the Fourier transform timing signal FTS as inputs, and detects the amount of change τ when the Fourier transform timing changes. FIG. 6 shows the relationship between the Fourier transform timing signal FTS and the signal input to the Fourier transform unit 1. Normally (when the Fourier transform timing does not change), the Fourier transform timing signal FTS has a period equal to the symbol length of the received signal, as shown in FIG. 6, so the amount τ by which the Fourier transform timing signal FTS changes can be calculated by determining the temporal difference between a particular phase in this period (e.g., the start of the period) and the actual input of the Fourier transform timing signal FTS.

Next, the relationship between the time difference detected by the timing change amount detector 8 and the amount of phase modification by the phase correction unit 9 will be described. It will be assumed that the receiver performs the Fourier transform on a signal from which the guard intervals have been correctly removed and the nth Fourier transform output in the mth symbol is represented by the above equation (1). It also will be assumed that the starting time of the Fourier transform is advanced by τ in the m+1st symbol. It is also assumed that τ is less than the length of the guard interval, so there is no inter-symbol interference. If the characteristic value (frequency response) for the m+1st symbol is denoted $h_{m+1,n}$, then the nth Fourier transform output in the m+1st symbol can be represented by equation (28), which is similar to equation (9).

$$r_{m+1,n} = h_{m+1,n} c_{m+1,n} \exp[j2\pi n f_0 \tau] \qquad (28)$$

As can be seen from equations (1) and (28), a change in the Fourier transform timing introduces a phase rotation in the nth carrier. Therefore, it suffices for the phase correction unit 9 to modify the phase according to the timing difference detected by the timing change amount detector 8. For example, when a pilot signal is inserted in the nth carrier at every fourth symbol, and the Fourier transform timing of the m+1st symbol is advanced by the amount τ in comparison with the mth symbol, the phase modification amount θ can be represented by the following equation (29).

$$\theta_n = 2\pi n f_0 \tau \qquad (29)$$

Whether or not the phase correction unit 9 modifies the phase of the output from the divider 3 is determined from whether or not the Fourier transform timing has changed, and from the particular symbol to be equalized in the equalization unit 7. When all symbols used by the time-direction interpolation unit 10 are Fourier-transformed with the same Fourier transform timing, no phase modification is performed. When a symbol used by the time-direction interpolation unit 10 is Fourier-transformed with a different Fourier transform timing, a phase modification is performed according to the Fourier transform timing with which the symbol to be equalized in the equalization unit 7 was Fourier-transformed. Specifically, a phase correction according to equation (29) is performed on symbols that have been Fourier-transformed with a Fourier transform timing different from that of the symbol to be equalized. In other words, when interpolation is carried out using, as original data, a channel characteristic value calculated using a pilot signal included in a symbol that has been Fourier-transformed with a timing different from the symbol that will include the interpolated data (channel characteristic value) to be obtained by interpolation in the time-direction interpolation unit 10, the phase-modified original data are used in interpolation in the time-direction interpolation unit 10.

The output from the phase correction unit 9 is input to the time-direction interpolation unit 10, which performs interpolation processing in the time direction according to the output from the timing change detector 5. The operation of the time-direction interpolation unit 10 will now be described in detail. In the following explanation, it is assumed that the scattered pilots are arranged as shown in FIG. 4. It is also assumed that the receiver performs Fourier transforms on the symbols up to the M−1st symbol with Fourier transform timing A, and symbols following the Mth symbol with Fourier transform timing B. If linear interpolation is performed using pilot signals in seven symbols in the interpolation processing in the time direction to calculate the channel characteristic values, then the symbols for which all seven symbols have been Fourier-transformed with Fourier transform timing A are the symbols up to the M−4th symbol. Similarly, the symbols for which all seven symbols have been Fourier-transformed with Fourier transform timing B are the symbols from the M+3rd symbol onward. Therefore, since no phase correction is necessary for estimation of channel characteristic values for these symbols, interpolation processing in the time direction is carried out by the conventional method in the time-direction interpolation unit 10.

Next, descriptions will be given for the symbols from the M−3rd symbol to the M+2nd symbol. For these symbols, the seven consecutive symbols include symbols that have been Fourier-transformed with Fourier transform timing A and symbols that have been Fourier-transformed with Fourier transform timing B. Accordingly, when the pilot signals inserted in these symbols are used for interpolation in the time direction, if time-direction interpolation were to be carried out using pilot signals that had been Fourier-transformed with different Fourier transform timings, incorrect interpolation results would be calculated. Therefore, when interpolation processing in the time direction is carried out, whether to have the phase correction unit 9 modify the phase of the output of the divider 3 is determined depending on the Fourier transform timing with which the symbol for which a channel characteristic value (estimated value) is to be obtained, that is, the symbol to be equalized in the equalization unit 7, was Fourier-transformed.

First, the operation of the time-direction interpolation unit 10 in estimating the channel characteristic values of the M−3rd symbol will be described. The pilot signals that provide the original data for interpolation in the time direction are found from the M−6th symbol to the Mth symbol, of which the M−6th to M−1st symbols were Fourier-transformed with Fourier transform timing A. Interpolation between the pilot signals included in the M−6th and M−2nd symbols and between the pilot signals included in the M−5th and M−1st symbols is therefore carried out by conventional linear interpolation. Channel characteristic values for the pilot signals included in the M−3rd symbol are output from the divider 3, so interpolation processing is unnecessary; the unaltered outputs of the divider 3 are used with no phase modification in the phase correction unit 9. In interpolation between pilot signals included in the M−4th and Mth symbols, the phase correction unit 9 modifies the phase of the output of the divider 3 for the pilot signal included in the Mth symbol; linear interpolation is carried out on the result of the phase modification and the output from the divider 3 for the pilot signal included in the M−4th symbol to produce the output of the time-direction interpolation unit 10. The amount of phase modification is determined according to equation (28).

The above operations will now be shown specifically. It will be assumed that the Nth carrier in the Mth symbol is a scattered pilot $s_{M,N}$ and that its estimated channel characteristic value is $h'_{M,N}$. In the M−3rd symbol, for example, $s_{M-3,N+3}$ is a scattered pilot. The channel characteristic value of the N+3rd carrier is accordingly output from the divider 3, there is no need for interpolation, and the unaltered output of the divider 3 is used as the output of the time-direction interpolation unit 10 without phase modification by the phase correction unit 9. For the N+6th and N+9th carriers, linear interpolation is carried out using the pilot signals included in the M−6th and M−2nd symbols and the pilot signals included in the M−5th and M−1st symbols, respectively, and the results are used as the output of the time-direction interpolation unit 10.

For the Nth carrier, however, the phase of the corresponding output of the divider 3 for the Mth symbol is modified in the phase correction unit 9 and linear interpolation is performed to produce the output of the time-direction interpolation unit 10 as shown in the following equation (30).

$$h'_{M-3,N} = (1/4)h'_{M,N}\exp[-j2\pi Nf_0\tau] + (3/4)h'_{M-4,N} \quad (30)$$

Values are obtained for one out of every three carriers in the M−3rd symbol by the same method as above to produce the output of the time-direction interpolation unit 10.

Next, the operation of the time-direction interpolation unit 10 in estimating the channel characteristic values of the M−2nd symbol will be described. The pilot signals that provide the original data for interpolation in the time direction are found from the M−5th symbol to the M+1st symbol, of which the M−5th to M−1st symbols were Fourier-transformed with Fourier transform timing A. Interpolation between the pilot signals included in the M−5th and M−1st symbols is therefore carried out by conventional linear interpolation. Channel characteristic values for the pilot signals included in the M−2nd symbol are output from the divider 3, so interpolation processing is unnecessary; the unaltered outputs of the divider 3 are used without phase modification in the phase correction unit 9. In interpolation between pilot signals included in the M−4th and Mth symbols, the phase correction unit 9 modifies the phase of the output of the divider 3 for the pilot signal included in the Mth symbol; linear interpolation is carried on the result of the phase modification and the output from the divider 3 for the pilot signal included in the M−4th symbol to produce the output of the time-direction interpolation unit 10. Similarly, in interpolation between pilot signals included in the M−3rd and M+1st symbols, the phase correction unit 9 modifies the phase of the output of the divider 3 for the pilot signal included in the M+1st symbol; linear interpolation is carried out on the result of the phase modification and the output from the divider 3 for the pilot signal included in the M−3rd symbol to produce the output of the time-direction interpolation unit 10.

The above operations will now be shown specifically. It will be assumed that the Nth carrier in the Mth symbol is a scattered pilot $s_{M,N}$ and that its estimated channel characteristic value is $h'_{M,N}$. In the M−2nd symbol, for example, $s_{M-2,N+6}$ is a scattered pilot. The channel characteristic value of the N+6th carrier is accordingly output from the divider 3, there is no need for interpolation, and the unaltered output of the divider 3 is used as the output of the time-direction interpolation unit 10 without phase modification by the phase correction unit 9. For the N+9th carrier, linear interpolation is carried out using the pilot signals included in the M−5th and M−1st symbols as in the first embodiment.

For the Nth carrier, however, the phase of the corresponding output of the divider 3 for the Mth symbol is modified in the phase correction unit 9, and linear interpolation is performed to produce the output of the time-direction interpolation unit 10 as shown in the following equation (31).

$$h'_{M-2,N} = (\tfrac{1}{2})h'_{M,N}\exp[-j2\pi Nf_0\tau] + (\tfrac{1}{2})h'_{M-4,N} \quad (31)$$

For the N+3rd carrier, the corresponding output of the divider 3 for the M+3rd symbol is modified in the phase correction unit 9 and linear interpolation is performed to produce the output of the time-direction interpolation unit 10 as shown in the following equation (32).

$$h'_{M-2,N+3} = (\tfrac{1}{4})h'_{M+1,N+3}\exp[-j2\pi(N+3)f_0\tau] + (\tfrac{3}{4})h'_{M-3,N+3} \quad (32)$$

Values are obtained for one out of every three carriers in the M−2nd symbol by the same method as above to produce the output of the time-direction interpolation unit 10.

Next, the operation of the time-direction interpolation unit 10 in estimating the channel characteristic values of the M−1st symbol will be described. The pilot signals that provide the original data for interpolation in the time direction are found from the M−4th symbol to the M+2nd symbol, of which the M−4th to M−1st symbols were Fourier-transformed with Fourier transform timing A. Channel characteristic values for the pilot signals included in the M−1st symbol are output from the divider 3, so interpolation processing is unnecessary; the unaltered outputs of the divider 3 are used with no phase modification in the phase correction unit 9. In interpolation between pilot signals included in the M−4th and Mth symbols, the phase correction unit 9 modifies the phase of the output of the divider 3 for the pilot signal included in the Mth symbol; linear interpolation is carried out on the result of the phase modification and the output from the divider 3 for the pilot signal included in the M−4th symbol to produce the output of the time-direction interpolation unit 10. Similarly, in interpolation between pilot signals included in the M−3rd and M+1st symbols, the phase correction unit 9 modifies the phase of the output of the divider 3 for the pilot signal included in the M+1st symbol; linear interpolation is performed on the result of the phase modification and the output from the divider 3 for the pilot signal included in the M−3rd symbol to produce the output of the time-direction interpolation unit 10. Furthermore, in interpolation between pilot signals included in the M−2nd and M+2nd symbols, the phase correction unit 9 modifies the phase of the output of the divider 3 for the pilot signal included in the M+2nd symbol; linear interpolation is performed on the result of the phase modification and the output from the divider 3 for the pilot signal included in the M−2nd symbol to produce the output of the time-direction interpolation unit 10.

The above operations will now be shown specifically. It will be assumed that the Nth carrier in the Mth symbol is a scattered pilot $s_{M,N}$ and that its estimated channel characteristic value is $h'_{M,N}$. In the M−1st symbol, for example, $S_{M-1,N+9}$ is a scattered pilot. The channel characteristic value of the N+9th carrier is accordingly output from the divider 3, there is no need for interpolation, and the unaltered output of the divider 3 is used as the output of the time-direction interpolation unit 10 without phase modification by the phase correction unit 9.

For the Nth carrier, however, the phase of the corresponding output of the divider 3 for the Mth symbol is modified in the phase correction unit 9 and linear interpolation is performed to produce the output of the time-direction interpolation unit 10 as shown in the following equation (33).

$$h'_{M-1,N} = (\tfrac{3}{4})h'_{M,N}\exp[-j2\pi Nf_0\tau] + (\tfrac{1}{4})h'_{M-4,N} \quad (33)$$

For the N+3rd carrier, the phase of the corresponding output of the divider 3 for the M+1st symbol is modified in the phase correction unit 9 and linear interpolation is performed to produce the output of the time-direction interpolation unit 10 as shown in the following equation (34).

$$h'_{M-1,N+3} = (\tfrac{1}{2})h'_{M+1,N+3}\exp[-j2\pi(N+3)f_0\tau] + (\tfrac{1}{2})h'_{M-3,N+3} \quad (34)$$

For the N+6th carrier, the phase of the corresponding output of the divider 3 for the M+2nd symbol is modified in the phase correction unit 9 and linear interpolation is performed to produce the output of the time-direction interpolation unit 10 as shown in the following equation (35).

$$h'_{M-1,N+3} = (\tfrac{1}{4})h'_{M+2,N+6}\exp[-j2\pi(N+6)f_0\tau] + (\tfrac{3}{4})h'_{M-2,N+6} \quad (35)$$

Values are obtained for one out of every three carriers in the M−1st symbol by the same method as above to produce the output of the time-direction interpolation unit 10.

Next, the operation of the time-direction interpolation unit 10 in estimating the channel characteristic values of the Mth symbol will be described. The pilot signals that provide the original data for interpolation in the time direction are found from the M−3rd symbol to the M+3rd symbol, of which the Mth to M+3rd symbols were Fourier-transformed with Fourier transform timing B. Channel characteristic values for the pilot signals included in the Mth symbol are output from the divider 3, so interpolation processing is unnecessary; the unaltered outputs of the divider 3 are used with no phase modification in the phase correction unit 9. In interpolation between pilot signals included in the M−3rd and M+1st symbols, the phase correction unit 9 modifies the phase of the output of the divider 3 for the pilot signal included in the M−3rd symbol; linear interpolation is carried out on the result of the phase modification and the output from the divider 3 for the pilot signal included in the M+1st symbol to produce the output of the time-direction interpolation unit 10. Similarly, in interpolation between pilot signals included in the M−2nd and M+2nd symbols, the phase correction unit 9 modifies the output from the divider 3 for the pilot signal included in the M−2nd symbol; linear interpolation is performed on the result of the phase modification and the output from the divider 3 for the pilot signal included in the M+2nd symbol to produce the output of the time-direction interpolation unit 10. Furthermore, in interpolation between pilot signals included in the M−1st and M+3rd symbols, the phase correction unit 9 modifies the output from the divider 3 for the pilot signal included in the M−1st symbol; linear interpolation is performed on the result of the phase modification and the output from the divider 3 for the pilot signal included in the M+3rd symbol to produce the output of the time-direction interpolation unit 10.

The above operations will now be shown specifically. It will be assumed that the Nth carrier in the Mth symbol is a scattered pilot $s_{M,N}$ and that its estimated channel characteristic value is $h'_{M,N}$. The channel characteristic value of the Nth carrier in the Mth symbol is accordingly output from the divider 3, there is no need for interpolation, and the unaltered output of the divider 3 is used as the output of the time-direction interpolation unit 10 without phase modification by the phase correction unit 9.

For the N+3rd carrier, however, the phase of the corresponding output of the divider 3 for the M−3rd symbol is modified in the phase correction unit 9 and linear interpolation is performed to produce the output of the time-direction interpolation unit 10 as shown in the following equation (36).

$$h'_{M,N+3} = (\tfrac{1}{4})h'_{M-3,N+3}\exp[-j2\pi(N+3)f_0\tau] + (\tfrac{3}{4})h'_{M+1,N+3} \quad (36)$$

For the N+6th carrier, the phase of the corresponding output of the divider 3 for the M−2nd symbol is modified in the phase correction unit 9 and linear interpolation is performed to produce the output of the time-direction interpolation unit 10 as shown in the following equation (37).

$$h'_{M,N+6} = (1/2)h'_{M-2,N+6}\exp[-j2\pi(N+6)f_0\tau] + (1/2)h'_{M+2,N+6} \quad (37)$$

For the N+9th carrier, the phase of the corresponding output of the divider 3 for the M−1st symbol is modified in the phase correction unit 9 and linear interpolation is performed to produce the output of the time-direction interpolation unit 10 as shown in the following equation (38).

$$h'_{M,N+9} = (3/4)h'_{M-1,N+9}\exp[-j2\pi(N+9)f_0\tau] + (1/4)h'_{M+3,N+9} \quad (38)$$

Values are obtained for one out of every three carriers in the Mth symbol by the same method as above to produce the output of the time-direction interpolation unit 10.

Next, the operation of the time-direction interpolation unit 10 in estimating the channel characteristic values of the M+1st symbol will be described. The pilot signals that provide the original data for interpolation in the time direction are found from the M−2nd symbol to the M+4th symbol, of which the Mth to M+4th symbols were Fourier-transformed with Fourier transform timing B. Conventional linear interpolation is performed between the pilot signals included in the Mth and M+4th symbols. Channel characteristic values for the pilot signals included in the M+1st symbol are output from the divider 3, so interpolation processing is unnecessary; the unaltered outputs of the divider 3 are used without phase modification in the phase correction unit 9. In interpolation between pilot signals included in the M−2nd and M+2nd symbols, the phase correction unit 9 modifies the phase of the output of the divider 3 for the pilot signal included in the M−2nd symbol; linear interpolation is performed on the result of the phase modification and the output from the divider 3 for the pilot signal included in the M+2nd symbol to produce the output of the time-direction interpolation unit 10. Similarly, in interpolation between pilot signals included in the M−1st and M+3rd symbols, the phase correction unit 9 modifies the phase of the output of the divider 3 for the pilot signal included in the M−1st symbol; linear interpolation is performed on the result of the phase modification and the output from the divider 3 for the pilot signal included in the M+3rd symbol to produce the output of the time-direction interpolation unit 10.

The above operations will now be shown specifically. It will be assumed that the Nth carrier in the Mth symbol is a scattered pilot $s_{M,N}$ and that its estimated channel characteristic value is $h'_{M,N}$. In the M+1st symbol, the channel characteristic value of the N+3th carrier is output from the divider 3, there is no need for interpolation, and the unaltered output of the divider 3 is used as the output of the time-direction interpolation unit 10 without phase modification by the phase correction unit 9. For the Nth carrier, linear interpolation using the pilot signals included in the Mth and M+4th symbols is performed as in the first embodiment.

For the N+6th carrier, however, the phase of the corresponding output of the divider 3 for the M−2nd symbol is modified in the phase correction unit 9 and linear interpolation is performed to produce the output of the time-direction interpolation unit 10 as shown in the following equation (39).

$$h'_{M+1,N+6} = (1/4)h'_{M-2,N+6}\exp[-j2\pi(N+6)f_0\tau] + (3/4)h'_{M+2,N+6} \quad (39)$$

For the N+9th carrier, the phase of the corresponding output of the divider 3 for the M−1st symbol is modified in the phase correction unit 9 and linear interpolation is performed to produce the output of the time-direction interpolation unit 10 as shown in the following equation (40).

$$h'_{M+1,N+9} = (1/2)h'_{M-1,N+9}\exp[-j2\pi(N+9)f_0\tau] + (1/2)h'_{M+3,N+9} \quad (40)$$

Values are obtained for one out of every three carriers in the M+1st symbol by the same method as above to produce the output of the time-direction interpolation unit 10.

Next, the operation of the time-direction interpolation unit 10 in estimating the channel characteristic values of the M+2nd symbol will be described. The pilot signals that provide the original data for interpolation in the time direction are found from the M−1st symbol to the M+5th symbol, of which the Mth to M+5th symbols were Fourier-transformed with Fourier transform timing B. Conventional linear interpolation is performed between the pilot signals included in the Mth and M+4th symbols, and the pilot signals included in the M+1st and M+5th symbols. Channel characteristic values for the pilot signals included in the M+2nd symbol are output from the divider 3, so interpolation processing is unnecessary; the unaltered outputs of the divider 3 are used without phase modification in the phase correction unit 9. In interpolation between pilot signals included in the M−1st and M+3rd symbols, the phase correction unit 9 modifies the phase of the output of the divider 3 for the pilot signal included in the M−1st symbol; linear interpolation is performed on the result of the phase modification and the output from the divider 3 for the pilot signal included in the M+3rd symbol to produce the output of the time-direction interpolation unit 10.

The above operations will now be shown specifically. It will be assumed that the Nth carrier in the Mth symbol is a scattered pilot $s_{M,N}$ and that its estimated channel characteristic value is $h'_{M,N}$. In the M+2nd symbol, the channel characteristic value of the N+6th carrier is accordingly output from the divider 3, there is no need for interpolation, and the unaltered output of the divider 3 is used as the output of the time-direction interpolation unit 10 without phase modification by the phase correction unit 9. For the Nth carrier, linear interpolation using the pilot signals included in the Mth and M+4th symbols is performed. For the N+3rd carrier, linear interpolation using the pilot signals included in the M+1st and M+5th symbols is performed.

For the N+9th carrier, however, the phase of the corresponding output of the divider 3 for the M−1st symbol is modified in the phase correction unit 9 and linear interpolation is performed to produce the output of the time-direction interpolation unit 10 as shown in the following equation (41).

$$h'_{M+2,N+9} = (1/4)h'_{M-1,N+9}\exp[-j2\pi(N+9)f_0\tau] + (3/4)h'_{M+3,N+9} \quad (41)$$

Values are obtained for one out of every three carriers in the M+2nd symbol by the same method as above to produce the output of the time-direction interpolation unit 10.

As shown above, a receiving apparatus according to the second embodiment of the invention detects changes in the Fourier transform timing signal FTS, detects the amount of change, and when estimating channel characteristic values for the preceding and following symbols, performs interpolation processing in the time direction with a phase correction according to the amount of change in the Fourier transform timing, so that mistakes in interpolation processing in the time direction due to changes in the Fourier transform timing can be reduced and channel characteristics can be estimated more accurately than by previous methods, enabling the receiving performance of the receiver to be improved.

In the example above, interpolation was carried out by using the original data most closely preceding and the original data most closely following the interpolated data to be generated by interpolation, but interpolation may be carried out using other data as the original data. A case in which the interpolation process in the time direction was carried out as linear interpolation using channel characteristic values (frequency responses) calculated from two pilot signals was shown, but the interpolation process in the time direction may be carried out by an interpolation process using channel characteristic values (the outputs of the phase correction unit 9) calculated from three or more pilot signals. Interpolation by a FIR filter, spline interpolation, and various other types of signal processing may be considered for the interpolation process in this case. Regardless of the type of interpolation process carried out, when the Fourier transform timing is changed, a phase correction is applied by a similar method to the symbol that was Fourier-transformed with a different timing from the symbol to be equalized, interpolation is carried out, and the value of the channel characteristic is output. The phase correction value is calculated as in equation (29) based on the amount of change in timing relative to the Fourier transform timing of the symbol to be equalized.

INDUSTRIAL APPLICABILITY

The invention can be applied to receivers for terrestrial digital broadcasts made using orthogonal frequency division multiplexing.

What is claimed is:

1. A receiving apparatus for receiving an orthogonal frequency division multiplexed signal in which the unit of transmission is a symbol including a valid symbol and a guard interval, the valid symbol being generated by distributing information over a plurality of carriers and modulating the information onto the carriers, the guard interval being generated by copying the signal waveform of part of the valid symbol, and in which pilot signals with values known at the time of transmission are included in the symbols, the pilot signals being inserted at frequency positions that differ from symbol to symbol, the receiving apparatus comprising:
 a Fourier transform unit configured to Fourier-transform, symbol by symbol, a received signal obtained by performing a frequency conversion to a desired frequency;
 a pilot extraction unit configured to extract signals from the output of the Fourier transform unit;
 a divider configured to calculate a channel characteristic value for each pilot signal in each symbol by dividing the value of the pilot signal extracted by the divider by the known value of the pilot signal;
 a timing change detector configured to detect that the timing of the Fourier transform in the Fourier transform unit has changed;
 a time-direction interpolation unit configured to generate first interpolated data by performing interpolation in the time direction with the channel characteristic values for each pilot signal in each symbol output from the divider as original data, responsive to timing changes detected by the timing change detector, and outputting the generated first interpolated data together with the original data from the divider;
 a frequency-direction interpolation unit configured to generate second interpolated data by performing interpolation in the frequency direction, using the output of the time-direction interpolation unit, and outputting the generated second interpolated data together with the output of the time-direction interpolation unit; and
 an equalization unit configured to perform demodulation, carrier by carrier, by dividing the output of the Fourier transform unit by the output of the frequency-direction interpolation unit; wherein
 the time-direction interpolation unit performs said interpolation by using both the original data preceding and the original data following the first interpolated data to be generated by interpolation when these two original data were generated using pilot signals included in symbols that were Fourier-transformed with the same timing as the symbol in which the first interpolated data to be generated by interpolation are included, and
 the time-direction interpolation unit performs said interpolation by using one of the original data preceding and the original data following the interpolated data to be generated by interpolation when these two original data were generated using pilot signals included in symbols that were Fourier-transformed with different timings, the one being used having been generated using pilot signals included in a symbol that was Fourier-transformed with the same timing as the symbol in which the first interpolated data to be generated by interpolation are included.

2. The receiving apparatus of claim 1, wherein the time-direction interpolation unit:
 generates the first interpolated data by performing interpolation using both the original data most closely preceding and the original data most closely following the first interpolated data to be generated by interpolation when these two original data were generated using pilot symbols included in symbols that were Fourier-transformed with mutually identical timings; and
 generates the first interpolated data, when one of the original data most closely preceding and the original data most closely following the first interpolated data to be generated by interpolation was generated using a pilot signal included in a symbol that was Fourier-transformed with a timing differing from that of the symbol in which the first interpolated data to be generated by interpolation are included and another one of the two original data was generated using a pilot signal included in a symbol that was Fourier-transformed with the same timing as that of the symbol in which the first interpolated data to be generated by interpolation are included, by selecting as the first interpolated data the original data generated using the pilot signal included in the symbol that was Fourier-transformed with the same timing.

3. A receiving method for receiving an orthogonal frequency division multiplexed signal in which the unit of transmission is a symbol including a valid symbol and a guard interval, the valid symbol being generated by distributing information over a plurality of carriers and modulating the information onto the carriers, the guard interval being generated by copying the signal waveform of part of the valid symbol, and in which pilot signals with values known at the time of transmission are included in the symbols, the pilot signals being inserted at frequency positions that differ from symbol to symbol, the receiving method comprising:
 a Fourier transform step for Fourier-transforming, symbol by symbol, a received signal obtained by performing a frequency conversion to a desired frequency;
 a pilot extraction step for extracting pilot signals from results of Fourier transforms in the Fourier transform step;
 a division step for calculating a channel characteristic value for each pilot signal in each symbol by dividing the value of the pilot signal extracted in the division step by the value of the pilot signal at its time of transmission;

a timing change detection step for detecting that the timing of the Fourier transform in the Fourier transform step has changed;

a time-direction interpolation step for generating first interpolated data by performing interpolation in the time direction with the channel characteristic values for each pilot signal in each symbol obtained in the division step as original data, responsive to timing changes detected in the timing change detection step, and outputting the generated first interpolated data together with the original data from the division step;

a frequency-direction interpolation step for generating second interpolated data by performing interpolation in the frequency direction, using results obtained in the time-direction interpolation step, and outputting the generated second interpolated data together with the output of the time-direction interpolation step; and an equalization step for performing demodulation, carrier by carrier, by dividing the results of the Fourier transforms in the Fourier transform step by results of the interpolation in the frequency-direction interpolation step; wherein the time-direction interpolation step performs said interpolation by using both the original data preceding and the original data following the first interpolated data to be generated by interpolation when these two original data were generated using pilot signals included in symbols that were Fourier-transformed with the same timing as the symbol in which the first interpolated data to be generated by interpolation are included, and the time-direction interpolation step performs said interpolation by using one of the original data preceding and the original data following the interpolated data to be generated by interpolation when these two original data were generated using pilot signals included in symbols that were Fourier-transformed with different timings, the one being used having been generated using pilot signals included in a symbol that was Fourier-transformed with the same timing as the symbol in which the first interpolated data to be generated by interpolation are included.

4. The receiving method of claim 3, wherein the time-direction interpolation step:

generates the first interpolated data by performing interpolation using both the original data most closely preceding and the original data most closely following the first interpolated data to be generated by interpolation when these two original data were generated using pilot symbols included in symbols that were Fourier-transformed with mutually identical timings; and generates the first interpolated data, when one of the original data most closely preceding and the original data most closely following the first interpolated data to be generated by interpolation was generated using a pilot signal included in a symbol that was Fourier-transformed with a timing differing from that of the symbol in which the first interpolated data to be generated by interpolation are included and another one of the two original data was generated using a pilot signal included in a symbol that was Fourier-transformed with the same timing as that of the symbol in which the first interpolated data to be generated by interpolation are included, by selecting as the first interpolated data the original data generated using the pilot signal included in the symbol that was Fourier-transformed with the same timing.

* * * * *

UNITED STATES PATENT AND TRADEMARK OFFICE
CERTIFICATE OF CORRECTION

| | | |
|---|---|---|
| PATENT NO. | : 8,077,781 B2 | Page 1 of 1 |
| APPLICATION NO. | : 11/792345 | |
| DATED | : December 13, 2011 | |
| INVENTOR(S) | : Jun Ido | |

It is certified that error appears in the above-identified patent and that said Letters Patent is hereby corrected as shown below:

ON THE TITLE PAGE:

At item (86), change "PCT/JP2006/009451" to --PCT/JP2006/309451--.

Signed and Sealed this
Eighth Day of May, 2012

David J. Kappos
*Director of the United States Patent and Trademark Office*